Aug. 3, 1965    J. A. MARLAND ETAL    3,198,305
ONE-WAY CLUTCH WITH LUBRICANT CONTAINING HOUSING
Filed July 16, 1963    2 Sheets-Sheet 1

Inventors:
Joseph A. Marland
Charles W. Hill
By: Stone, Nieman,
Burmeister & Zummer
Attorneys Aug. 3, 1965 J. A. MARLAND ETAL 3,198,305
ONE-WAY CLUTCH WITH LUBRICANT CONTAINING HOUSING
Filed July 16, 1963 2 Sheets-Sheet 2
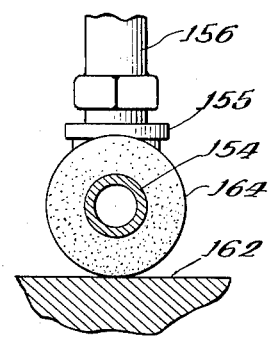
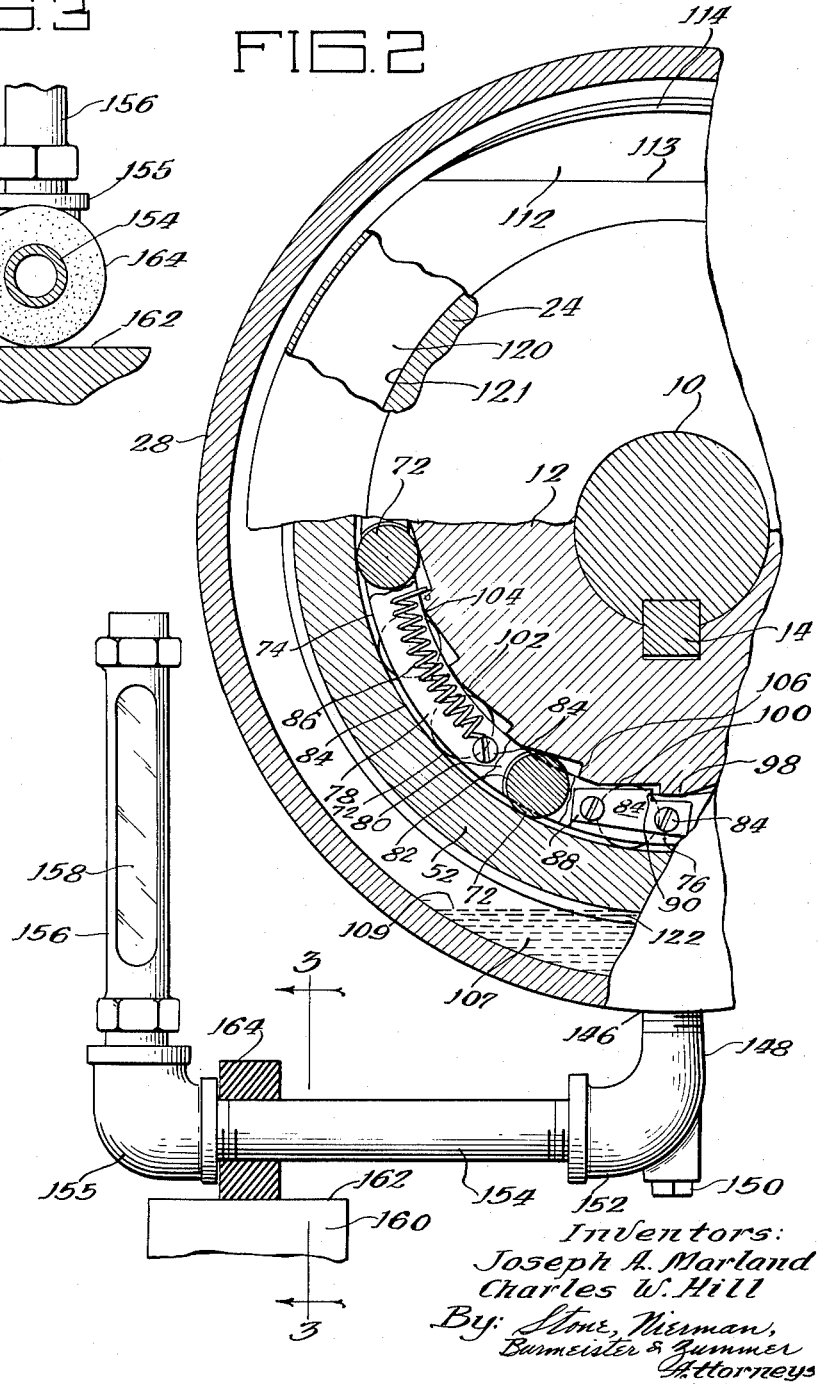
Inventors:
Joseph A. Marland
Charles W. Hill
By: Stone, Nieman,
Burmeister & Zummer
Attorneys 3,198,305
ONE-WAY CLUTCH WITH LUBRICANT
CONTAINING HOUSING
Joseph A. Marland, Elm and Washington Aves., La
Grange, Ill., and Charles W. Hill, La Grange, Ill.; said
Hill assignor to said Marland
Filed July 16, 1963, Ser. No. 295,448
10 Claims. (Cl. 192—113)

The present invention relates to one-way clutches, to the mechanism for lubricating one-way clutches, and to the mechanism for mounting one-way clutches.

A one-way clutch is a clutch which will couple a first shaft to a second shaft for rotation responsive to a force applied in one direction on the first shaft and will provide free wheeling if the force on the first shaft is in the reverse direction. A one-way clutch may simply be a ratchet and paul, but generally one-way clutches are either of the roller construction or of the sprag construction. In the sprag construction, a cylindrical outer race is journaled about and spaced from a cylindrical inner race, and a plurality of drive elements, called sprags, which are non-cylindrical, are disposed between the inner and outer races. When a torque is placed on the inner race with respect to the outer race in one direction, the sprags wedge between the races to transmit force between the inner and outer race. However, if torque is applied in the reverse direction, the sprags do not wedge between the inner and outer race and the outer race is free to rotate about the inner race. A roller one-way clutch has one of the two races cylindrical in form, and the other race is provided with indentations forming inclined planes. The rollers are disposed within the indentations and wedge between the inclined planes and the opposite race for torques applied between the inner and outer races in one direction but are free to rotate in the indentations for torques in the other direction. An example of a roller clutch is set forth in the patent of Joseph A. Marland, No. 3,017,002 entitled "One-Way Clutch." The present invention will be illustrated with a one-way clutch of the roller type, although it is also applicable to sprag one-way clutches.

Prior to the present invention, one-way clutches have been lubricated in one of two principal manners. In one construction, the one-way clutch is mounted between a drive shaft and a driven shaft, and a circular opening is disposed coaxially about one of the shafts to permit a lubricant to be dripped directly into the outer race of the clutch. The outer race rotates exposed to the atmosphere and serves as a reservoir to contain a liquid lubricant. Such a clutch is not sealed from the ambient atmosphere, and is readily contaminated with dirt, moisture, abrasive particles, and the like. However, such a clutch has the advantage of being readily mounted on the drive and driven shafts, since there is no housing for the clutch structure which needs to be mounted on a mounting structure and aligned with the already aligned driven and driving shafts. A further disadvantage of a one-way clutch structure of this type is that the quantity of liquid lubricant introduced into the outer race of the clutch cannot be readily and accurately controlled, and such clutches tend to receive excessive lubrication resulting in a wedge of liquid lubricant preceding the rollers of the one-way clutch and generating friction and excessive heat.

One-way clutches have also been constructed with a housing disposed and journaled about the outer race of the clutch which is used for containing a liquid lubricant in order to keep the liquid lubricant isolated from the ambient atmosphere, and thus prevent dirt, grit, moisture, and contaminants generally from becoming mixed with the liquid lubricant. The only communication between the atmosphere within the housing of such a one-way clutch mechanism and the ambient atmosphere is by means of a filtered breather. In addition, the quantity of oil or liquid lubricant surrounding the clutch elements of a one-way clutch of this type may be controlled more readily than in a one-way clutch in which the outer race is exposed to the ambient atmosphere. With this construction, it is possible to use a sump within the housing to facilitate control of the quantity of liquid lubricant. In order to utilize the sump within the housing surrounding a one-way clutch of this type, however, it is necessary to prevent the housing from rotating, and this has been accomplished by mounting the housing on the same mounting structure as the bearings which are used to journal the driving and driven shafts to the one-way clutch. The necessity of mounting the housing for the one-way clutch on the mounting structure requires the housing to be aligned with the driven and driving shafts, since the inner and outer races of the clutch are journaled to bearings disposed within the housing. The fact that the housing must be aligned with the shafts makes installation of the one-way clutch more difficult and costly, limits the dimensions of replacement clutches severely, and substantially complicates service and replacement of one-way clutches.

It is an object of the present invention to provide a one-way clutch which may be mounted on a driven shaft and a driving shaft without attachment to any supporting structure and in which a lubricating system is provided which is isolated from the ambient atmosphere.

It is a further object of the present invention to provide a one-way clutch with an inner and an outer race journaled within a housing in which the clutch structure is substantially supported by the driving and driven shafts and in which the clutch is provided with a lubrication system limiting the amount of lubricant disposed about the clutch elements between the inner and outer race of the clutch.

It is a further object of the present invention to provide a shaft coupler for use between a driven and a driving shaft having a housing journaled about the shafts and substantially supported thereby and a lubricant sump within the housing which constitutes a portion of a lubrication system.

These and further objects of the present invention will become readily apparent to those skilled in the art from the further consideration of this specification, particularly when considered in the light of the drawings, in which:

FIGURE 2 is a sectional view taken along line 2—2 of FIGURE 1; and

FIGURE 3 is a sectional view taken along line 3—3 of FIGURE 2.

Figure 1:
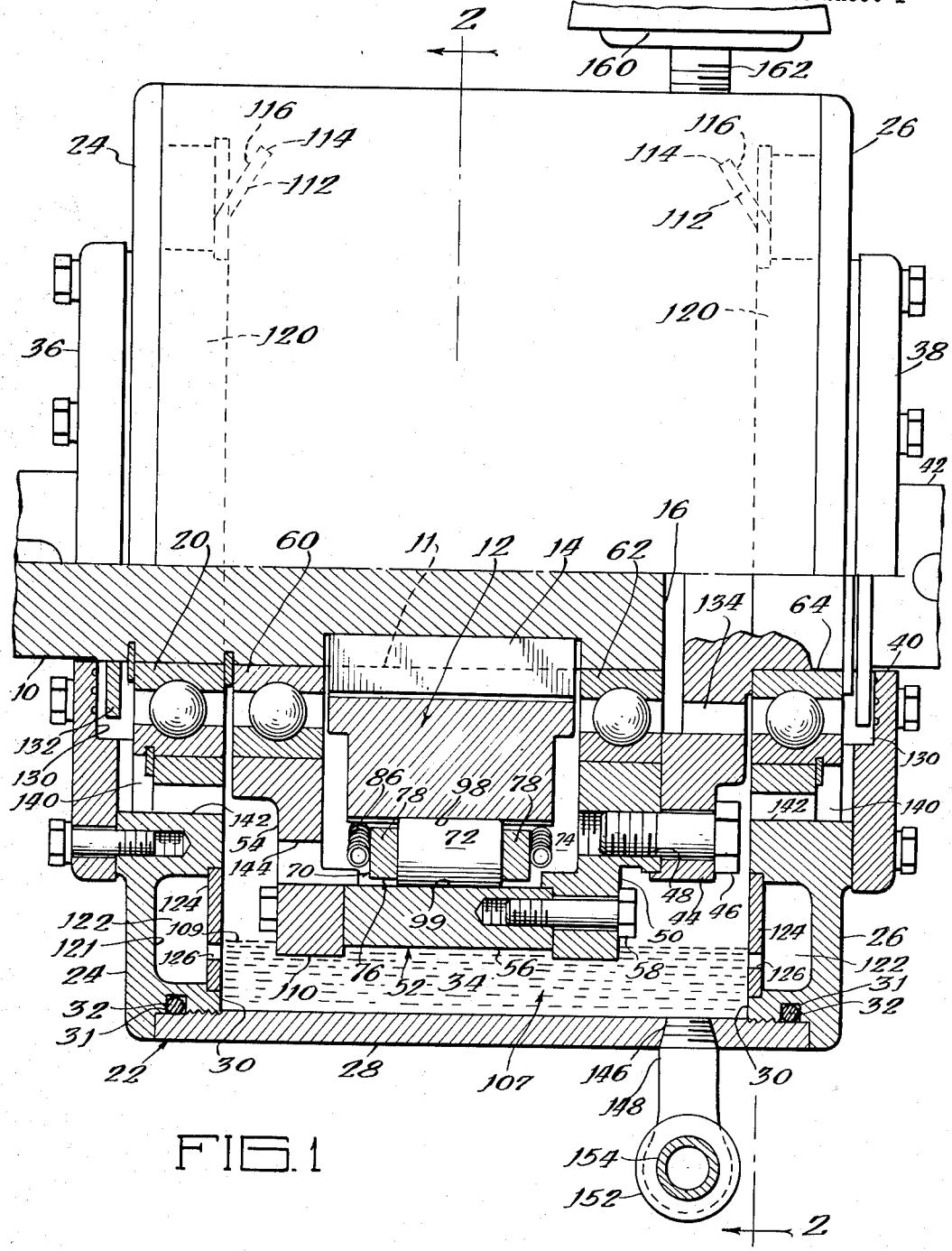
FIGURE 1 is a side elevational view of a clutch mechanism utilizing the teachings of the present invention, the lower half of the clutch mechanism being a vertical section taken through the center of the clutch mechanism.

As illustrated in the FIGURES 1 and 2, the clutch has an input shaft 10 extending axially into an interior bore 11 of a clutch inner race 12 and secured therein by means of an axially extending key 14. With this connection, the inner race 12 will rotate whenever shaft 10 is rotated. The shaft 10 extends through the inner race 12 and terminates in a surface 16 normal to the axis of the shaft 10 and spaced from the end of inner race 12 for the purpose of engaging a ball bearing assembly 62, as will be described hereinafter. The shaft 10, on the side of the inner race opposite the bearing assembly 62, is journaled for rotation within a ball bearing assembly 20, the outer portion of which is fitted into and mounted on a stationary end plate 24 of a housing 22.

The housing 22, which is generally cylindrical, completely encloses the clutch and includes circular end plates 24 and 26 enclosing the axial ends of the clutch and a cylindrical side wall 28 which extends between the end plates 24 and 26. The clutch housing walls 24, 26, and 28 may be suitable assembled by interiorly threading the axial ends of the side wall 28 and suitably threading the outer surface of a cylindrical flange wall 30 of each end plate to mate with the threading of the side wall 28. The flange walls 30 are provided with circular grooves 31 and an O-ring 32 is disposed in each groove between the flange wall 30 and the housing side wall 28 to seal the housing and to complete a lubricant retentive sump 34 in the lower portion of the housing 22. About the shaft axes, plates 24 and 26 have bolts mounted annular confining discs 36 and 38, respectively. Removal of each of these discs 36 and 38 allows access to the housing interior.

Extending through an axial circular opening 40 in cover plate 26 at the end opposed to the extent of shaft 10, is an output shaft 42. This shaft 42 carries a radially extending circular flange 44 which is parallel to cover plate 26 and inwardly thereof. This flange 44 is connected by suitable bolts 46 into tapped bores 48 angularly spaced about an annular wall 50 of an outer race 52. Outer race 52 includes two annular end plates or walls 50 and 54 and a cylindrical side wall 56, all coaxially disposed and suitably joined by bolts 58 to coaxially enclose the inner race 12. The end plates bear, at their radially inner ends, ball bearing assemblies 60 and 62 which journal the outer race 52 on the input shaft 10, the input shaft 10 terminating at the output end of the bearing assembly 62. A fourth ball bearing assembly 64 journals the output shaft 42 within end plate 26 of the clutch housing 22. The outermost of these bearing assemblies 20 and 64 are aligned interiorly of mounting discs 36 and 38 such that removal of the discs allows ready access to these bearing assemblies.

Interposed between the inner race 12 and the peripheral wall 56 of the outer race 52 is a clutching roller assembly 70, which comprises a plurality of cylindrical rollers 72, each disposed parallel to the axis of input shaft 10 and to the clutch elements coaxial thereto (inner race 12 and outer race 52). These rollers 72 are spaced in an annular gap 74 between the inner and outer race. Rollers 72 are confined within a yoke or cage 76 which is formed by a pair of outer rings 78 which extend about the end of the rollers and a plurality of spacers 80, one spacer being disposed between each pair of adjacent rollers 72. The spacers 80 have concave surfaces 82 confronting the rollers 72 and having concave surfaces of radius approximately the same as the rollers, and are mounted at their ends on the rings 78 by means of bolts 84. The cage 76 is spring-biased with respect to the inner race 12 by a spring 86 mounted at one end on a bolt 84 and at the other end on the inner race 12 in order to spring bias the rollers 72 toward the engaging position. Also, a plate 88 is mounted on the cage end rings 78 by two of the bolts 84 and has a protruding tooth 90 facing the inner race 12.

The outer surface 98 of the inner race 12 confronts the roller assembly 70 and the inner surface 99 of the outer race 56, and the surface 98 is provided with a plurality of indentations 100, the number of which is equal to the number of rollers 72 in roller assembly 70. These indentations 100 form inclined planes with respect to the surface 98 and each indentation 100 has a flat inclined portion 102 disposed parallel to the axis of the inner race and each flat portion 102 extends an equal distance from a leading edge 104 forming an acute angle with the outer circumference of the inner race 12. Each flat portion 102 terminates in a trailing edge or surface 106 which may be substantially on a radius of the inner race 12. The flat portions 102 are each at the same angle relative to a radial plane from the inner race axis intersection of the leading edge 104 of the indentations.

The bias springs 86 spring bias the rollers 72 toward the leading edge 104 of indentations 100. Also, the tooth 90 of plate 88 is adapted to abut the trailing wall 106 of the inner race 12 in order to limit movement of the roller bearing assembly 70 in the counter clockwise direction as viewed in FIGURE 2, and thus make certain that the rollers 72 do not ride against the trailing edge or wall 106 of the indentations 100.

When the inner race 12 is rotated in the clockwise direction of FIGURE 2, the rollers 72 will assume a position adjacent the trailing wall 106 in which the rollers 72 are spaced from the outer race 52. On assuming this position, the rollers 72 will rotate with the inner race and will not transmit torque to the outer race. On rotation of shaft 10 and inner race 12 in the counter clockwise direction, the rollers 72 will ride outwardly on the flat inclined plane portions 102 toward the leading edge 104 of the indentations 100. In this outward position, the rollers wedge between the inclined plane portions 102 of the indentations 100 and the adjacent surface 99 of the outer race 56, driving the outer race in a counter clockwise direction.

The housing 22 utilizes its fluid retentive lower portion to serve as a sump 34 for maintaining a supply of lubricant for the clutch mechanism in a confined and filtered system relatively free of contaminants borne by the ambient atmosphere. A body of lubricant 107 is maintained in the sump 34 to a level above the outer surface of the cylindrical wall 56 of the outer race 52 as indicated by the line 109. The annular race side walls 50 and 54 each have a flange 110 which extends below the outer surface of the outer race cylindrical wall 56 into the sump and these flanges 110 and the outer surface of the cylinder 56 are emersed in the body 107 of lubricant. On rotation of the outer race 52 flanges 110 and cylinder 56 dip into the lubricant and raise a spray of lubricant throughout the entire interior of the housing 22. Raised lubricant is caught by either of the two opposed oblique lips 112 adjacent the top of housing 22. These lips 112 are circular segments of a ring 124 bent inwardly along a horizontal line 113 to provide a gap 114 to catch the lubricant spray. Lubricant caught by each plate 112 will flow down the sloped inner face 116 of the plate into an annular channel 120 located adjacent to the periphery of the end plate 24 or 26. Each of the channels 120 are formed by a circular indentation 121 disposed adjacent to the periphery of the end plates 24 and 26 and on the inner surface thereof and one of the rings 124. The rings 124 are sealed on the end plate 24 or 26, except for the opening formed by the lips 112.

Lubricant flows gravitationally through channels 120 into the lower ends of the channels, designated 122. The flow of lubricant out of the lower ends 122 of channels 120 is limited by the plate 124 which blocks the passage from the lower end of the channels 120 to the sump 34. A small opening 126 in each plate 124 confronting the sump 34 and at the lower end of the plate 124 allows a limited amount of lubricant to flow from the channels 120 into the sump 34 for recirculation.

The ball bearings 20, 60, 62, and 64 and the roller bearings 72 are all lubricated by the spray of liquid lubricant generated by rotation of the outer race 52. The end plate 24 is provided with a plurality of bores 142 which are disposed with axis on a circle coaxially disposed about the ball bearing assembly 20 and these bores extend inwardly to a circular recess 140 in the exterior surface of the end plate 24 which confronts the disc 36. The spray of liquid lubricant penetrates the bores 142 to lubricate the ball bearing assembly 20, and the lowermost bore 142, illustrated in FIGURE 1, serves as a drain to prevent excessive lubrication from building up in the recess 140. A circular deflector 132 is mounted about the shaft 10 between the ball bearing assembly 20 and a circular groove 130 in the disc 36 and tends to throw lubricant outwardly to prevent seepage of lubricant between the shaft 10 and the disc 36.

The surface of the ball bearing assembly 60 confronting the ball bearing assembly 20 is lubricated directly by the spray of liquid lubricant which extends between the outer race wall 54 and the end plate 24. The spray of liquid lubricant also passes through a plurality of bores 144 disposed adjacent to the periphery of the outer annular race wall 54 to enter the region between the inner race 12 and the outer race wall 54. This lubricant passing through the bores 144 lubricates the roller bearings 72 and the surface of the ball bearing assembly 60 confronting the inner race 12, and further penetrates to lubricate the ball bearing assembly 62. The ball bearing assembly 62 is further lubricated by the spray of liquid lubricant passing through a plurality of bores 134 disposed in the flange 44 about the output shaft 42. It is to be recognized that the bores 134, 144, and 142 also limit the quantity of lubricant disposed within the various recesses and cavities since they serve as drains.

The ball bearing assembly 64 is lubricated directly by the spray of lubricant between the flange 44 and the end plate 26. In addition, liquid lubricant passes through the bores 142 to the recess 140, as previously described in connection with the end plate 24.

The level 109 illustrated in FIGURES 1 and 2 of the body 107 of liquid lubricant in the sump 34 is the level of an operating clutch. When the clutch is inoperative, oil flows into the sump and increases the level of the lubricant therein.

To provide an indication of the lubricant level in the sump of housing 22, an opening 146 is threaded in the bottom of cylinder 28 of the housing 22. A T-connector 148 is threaded into the opening 146. A drain plug 150 closes the end of the connector 148. A pipe 154 extends horizontally from the connection 148 normal to the axis of the clutch races 12 and 52 to an elbow 155. A liquid level gauge 156 with an indicating glass 158 is mounted on the elbow 155. The pipe 154 abuts a surface 162 of a stationary mounting base 160 which is permanently and stationarily affixed to an adjacent floor or wall (not shown). A snubbing grommet or bushing 164 is fitted onto the horizontal pipe 154 adjacent to the elbow 155. This bushing 164 is annular and should be of sufficiently great outer diameter that it will contact and rest on the surface 162 of base 160. Bushing 164 may be fabricated of rubber or plastic or other compliant material.

For many applications, it is necessary to protect the lubricant of a one-way clutch from dirt, moisture, and other contamination present in the surrounding atmosphere. This has been done in the past by providing an essentially sealed housing disposed about the one-way clutch and mounted on a foundation structure, such as the floor of the building in which the clutch is utilized. In the present invention, the housing 28 is not mounted on a supporting structure, but is suspended or floated on the shafts 10 and 42. As a result, it is not necessary to align the inner race 12 and outer race 52 with the shafts 10 and 42, but only to provide alignment of the shafts 10 and 42. This eliminates the necessity of shimming or otherwise mounting the housing of the clutch on a supporting structure, such as the floor of a building or itself.

The housing 28 of the one-way clutch structure cannot be permitted to rotate since the quantity of lubricant available for the roller bearings 72 must be limited to prevent excessive heating due to friction with the lubricant. The present invention provides adequate but limited lubrication for the roller bearing assembly by utilizing the rotation of the outer race 52 to skim oil from the sump 34 in the form of a spray, and limits the level of the oil in the sump 34 by means of the flow restricting orifices 126 to limit the quantity of spray available within the housing 22 even though a relatively large volume of liquid lubricant is present within the housing. The housing 22 is prevented from rotation about the shafts 10 and 42 by means of the arm in the form of the pipe 154 mounted on the housing 22 and abutting the mounting structure 160. It is to be noted that the one-way clutch is intended for use with the outer race rotating in the free wheeling condition, and as a result, the tendency of the housing will be to rotate in the counterclockwise direction, as viewed in FIGURE 2. Hence, the pipe 154 extends to the left from the housing 22 so that it remains in abutment with the supporting structure 160. In this manner, it is not necessary to anchor the pipe 154 on the supporting structure 160, since rotation of the outer race will force the outer pipe in this direction.

The compliant grommet 164 damps vibrations in the one-way clutch generated by rotations of the shafts 10 and 42. The grommet 164 prevents sound generation at the vibration rate of the shafts 10 and 42 due to the arm or pipe 154 periodically pounding the foundation structure 160.

Pressure changes in the ambient atmosphere are permitted to change the pressure within the housing 22 by means of a breather 160 mounted at the top of the cylinder 28 and communicating with the interior of the housing 22 by means of a pipe 162.

From the foregoing disclosure, those skilled in the art will readily devise many modifications to the one-way clutch structure hereinbefore set forth. Further, those skilled in the art will apply the teachings of the present invention to many applications in addition to the application here described. It is therefore intended that the scope of the present invention be not limited by the foregoing disclosure, but rather only by the appended claims.

The invention claimed is:

1. A one-way clutch mechanism for coupling an input shaft to an output shaft separately journaled on a supporting base for rotation about a common axis comprising an output clutch member drivingly connected to said output shaft, an input clutch member drivingly connected to said input shaft, and clutching means interposed between said clutch members for coupling together said clutch members on rotation of said input shaft in a first direction and for uncoupling said clutch members on rotation of said input shaft in the opposed direction, a housing enclosing said clutch mechanism having a first opening encompassing the first shaft and a second opening encompassing the second shaft, a first bearing means mounted on the housing in the first opening and on the first shaft and a second bearing means mounted on the housing in the second opening and on the second shaft, said housing being suspended from the support base and rotatably supported by said first and second shafts, a lubricating means for the clutch members and clutching means disposed within the housing including a body of liquid lubricant disposed in the lowest portion of the housing and means for conveying portions of said body to the clutching means, a rigid arm mounted on the housing and extending in a direction having a component normal to the axis of both of said shafts, and a resilient snubbing member mounted on and extending from the arm and adapted to abut a stop on the supporting base to prevent the housing from rotating in the direction of rotation of the shafts.

2. A one-way clutch mechanism for coupling an input shaft to an output shaft separately journaled on a supporting base for rotation about a common axis comprising the combination of claim 1 wherein the housing is constructed of fluid impermeable material and provided with fluid-tight seals to the first and second shafts, in combination with a breather mounted on the housing and communicating with the interior thereof.

3. A device for coupling together a first shaft and a second shaft disposed on a common axis and rotatably mounted on a mounting structure, comprising the elements of claim 1 wherein the arm comprises a hollow tube in communication with the body of liquid lubricant disposed in the interior of the housing and disposed below the housing, in combination with a transparent oil level indicating member mounted on the end of the arm opposite the housing and extending upwardly from the arm.

4. A device for coupling together a first shaft and a second shaft disposed on a common axis and rotatably mounted on a mounting structure comprising a mechanical linkage connected between the first shaft and second shaft, and means for lubricating the mechanical linkage comprising a housing disposed about the mechanical linkage and rotatably mounted on the first shaft by a first bearing assembly and rotatably mounted on the second shaft by a second bearing assembly, said housing having a sump therein adapted to contain a body of liquid lubricant, the mechanical linkage having a portion rotatable with one of the shafts extending into the sump and being adapted to be partially immersed in the body of liquid lubricant, whereby rotation of said one shaft rotates the portion of the mechanical linkage and sprays liquid lubricant from the surfaces of said portion of the mechanical linkage within the housing, means from maintaining the sump at the lowest point of the housing including an arm extending from the housing normal to the axis of the first and second shafts and in a direction opposite the direction of motion of the shafts adjacent to the region of the housing of the mounting for the arm, a portion of the arm remote from the housing being adapted to abut the mounting structure of the first and second shaft, means for limiting the quantity of liquid lubricant sprayed within the housing comprising a trough positioned above the sump adapted to catch lubricant spray and a passage extending from the trough to the sump including a flow restricting orifice, and a compliant body disposed between the arm and the mounting structure.

5. A device for coupling together a first shaft and a second shaft disposed in a common axis and rotatably mounted on a mounting structure, comprising the elements of claim 4 wherein the mechanical linkage comprises a one-way clutch having a cylindrical outer race adapted to be partially immersed in the liquid lubricant in the sump and an inner race coaxially disposed within the outer race, the outer race being mounted on the first shaft and the inner race being mounted on the second shaft, said one-way clutch having a plurality of drive elements spaced between the inner and outer races and said drive elements wedging between the inner and outer races for torques applied between the inner and outer races in one direction and sliding between the inner and outer races for torques applied between the inner and outer races in the opposite direction.

6. A device for coupling together a first shaft and a second shaft disposed on a common axis and rotatably mounted on a mounting structure, comprising the elements of claim 5 wherein each of the drive elements of the one-way clutch is a cylindrical roller, and the inner race of the one-way clutch is provided with an indentation confronting each of the rollers having a flat surface disposed on a plane parallel to the axis of the inner race, and each of the flat surfaces being disposed at approximately the same angle to the radial plane passing through the intersection of the flat surface and the periphery of the inner race.

7. A device for coupling together a first shaft and a second shaft disposed on a common axis and rotatably mounted on a mounting structure comprising a one-way clutch having an inner race mounted on the first shaft and an outer race disposed coaxially about the inner race and mounted on the second shaft, said clutch having a first bearing assembly disposed on one side of the inner race and mounted between the outer race and the first shaft and a second bearing assembly disposed on the other side of the inner race and mounted between the outer race and the first shaft, said clutch having a plurality of drive elements disposed between the inner race and the outer race, rotation of the inner race relative to the outer race in one direction wedging the drive elements between the races to transmit torque therebetween and rotation of the inner race relative to the outer race in the opposite direction resulting in sliding of the drive elements between the races, means for lubricating the one-way clutch comprising a housing disposed about the inner race and outer race and rotatably mounted on the first shaft by a third bearing assembly and rotatably mounted on the second shaft by a fourth bearing assembly, said housing having a sump, disposed therein, a body of liquid lubricant disposed in the housing, means for maintaining the sump at the lowest point of the housing including an arm extending from the housing normal to the axis of the first and second shafts and in a direction opposite the direction of motion of the shafts adjacent to the region of the housing of the mounting for the arm, a portion of the arm remote from the housing being adapted to abut the mounting structure of the first and second shafts and means for raising liquid lubricant from the sump for contact with the one-way clutch.

8. A device for coupling together a first shaft and a second shaft disposed in a common axis and rotatably mounted on a mounting structure comprising the elements of claim 7 in combination with a breather having a tube mounted within an aperture disposed in the housing above the level of the sump.

9. A clutch mechanism for coupling and decoupling an input shaft and an output shaft coaxial thereto, the input and output shafts being individually journaled on a stationary base member, comprising an inner race adapted to be drivingly connected to said input shaft, an outer race coaxial to said inner race, said outer race being adapted to be drivingly connected to said output shaft, unidirectional clutch members interposed between said inner and outer races for coupling together said races on rotation of said input shaft in a first direction and for uncoupling said races on rotation of said input shaft in a second direction, a lubricant retentive clutch housing surrounding said inner and outer races, means suspending said housing from said shafts whereby said housing floats on said shafts, a pipe connected to the housing and extending from said housing in a plane normal to the shafts and in communication with the housing interior, a first portion of said pipe extending normal to the radius of the shafts at the point of connection to the housing a second portion remote from the housing and extending normal to said first portion of the pipe and toward a plane passing through the shafts parallel to the first portion, means in said second portion for indicating the pressure level of lubricant in said housing, said first portion being adapted to be positioned adjacent to the stationary base member with said base member being otherwise unconnected to said clutch mechanism, and a resilient snubbing ring disposed about said first portion of said pipe adapted to contact and rest on said base member, thereby damping vibrations emitted by said clutch mechanism and restricting rotation of said housing about the shafts.

10. A clutch mechanism for coupling and decoupling coaxially disposed input and output shafts, comprising an outer housing enclosing said clutch mechanism and rotatably supported on said shafts, means for circulating a flow of lubricant through said clutch mechanisms from a sump in said housing to a level above the axes of said shafts, passages in said housing for transmitting said lubricant from said level to the shafts and to the clutch mechanism, a lubricant level indicator for visually indicating the level of lubricant in said housing sump comprising a pipe extending outwardly from said housing and in communication with the lubricant in said housing sump, a portion of said pipe extending normal to said shaft axes, a vertical lubrication gauge at the remote end of said portion having a transparent visual scale for determining the lubricant level in said housing sump, a stationary base member adjacent said pipe portion and spaced therefrom, a resilient snubbing ring fitted about said pipe portion, said snubbing ring contacting the surface of said base to damp vibrations generated by the operation of said clutch mechanism.

References Cited by the Examiner
UNITED STATES PATENTS

| | | | |
|---|---|---|---|
| 2,054,377 | 9/36 | Havill et al. | |
| 2,225,315 | 12/40 | McCollum | 303—24 |
| 2,328,518 | 8/43 | Wahlberg et al. | 192—112 |
| 2,554,305 | 5/51 | Luehrs | 192—45 |
| 2,998,113 | 8/61 | Marland | 192—45 |

DAVID J. WILLIAMOWSKY, *Primary Examiner.*